United States Patent [19]

Powers, Jr.

[11] 3,827,596
[45] Aug. 6, 1974

[54] COOKWARE COVER RELEASE VALVE
[75] Inventor: Robert E. Powers, Jr., Columbia, S.C.
[73] Assignee: Carolina China, Inc., Columbia, S.C.
[22] Filed: Apr. 28, 1972
[21] Appl. No.: 248,540

[52] U.S. Cl............ 220/44 R, 220/55 PC, 251/216
[51] Int. Cl...................... B65d 51/16, F16k 31/44
[58] Field of Search............ 220/44 R, 55 PC, 55.3, 220/64 R; 251/215, 332, 210, 334, 216; 99/403; 126/369

[56] References Cited
UNITED STATES PATENTS

| 260,077 | 6/1882 | Archdeacon | 220/44 R |
|---|---|---|---|
| 412,534 | 10/1889 | Otto | 220/44 R |
| 446,034 | 2/1891 | Stites et al. | 220/44 R |
| 1,200,668 | 10/1916 | Swanberg | 251/210 |
| 1,217,725 | 2/1917 | Eckenroth | 251/210 |
| 1,276,325 | 8/1918 | Carling | 251/216 |
| 1,690,183 | 11/1928 | Stoughton | 51/216 |
| 2,107,200 | 2/1938 | Kennon | 251/332 |
| 2,260,381 | 10/1941 | Kennon | 241/332 |
| 2,513,350 | 7/1950 | Nelson | 220/55 PC |
| 3,632,014 | 1/1972 | Basile | 220/55 PC |
| R14,424 | 1/1918 | Scoville | 251/332 |

Primary Examiner—William I. Price
Assistant Examiner—Allan N. Shoap
Attorney, Agent, or Firm—Stevens, Davis, Miller & Mosher

[57] ABSTRACT

A cookware cover release valve is provided in a cover for a cookware utensil. The cover has a centered recessed well and an air inlet opening therein with a gasket encompassing the opening. A plate element with an opening in its center rests on top of the gasket. A bushing in turn is mounted on the plate. The gasket, the plate and the bushing are all centered about a screw in the well. An air gap exists between the bushing and screw. A turnable knob is mated to the screw above the bushing to open and close the air gap to help regulate the pressure therein.

10 Claims, 2 Drawing Figures

Fig. 1
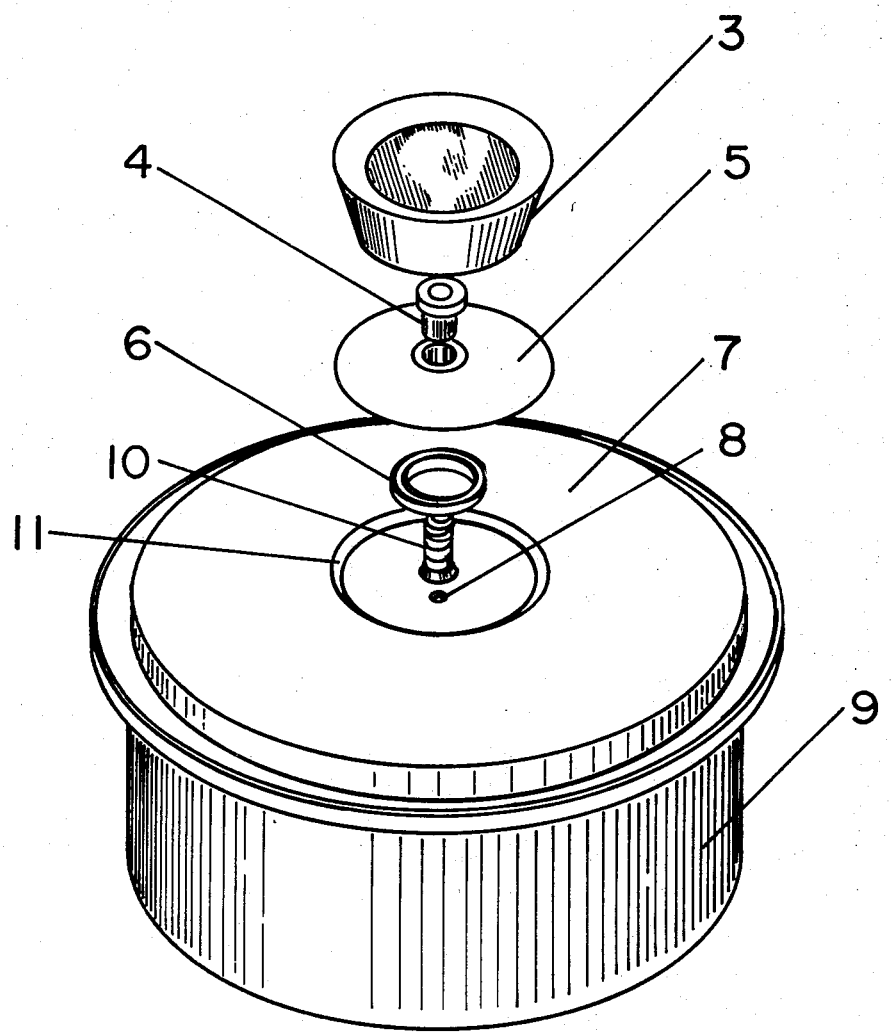
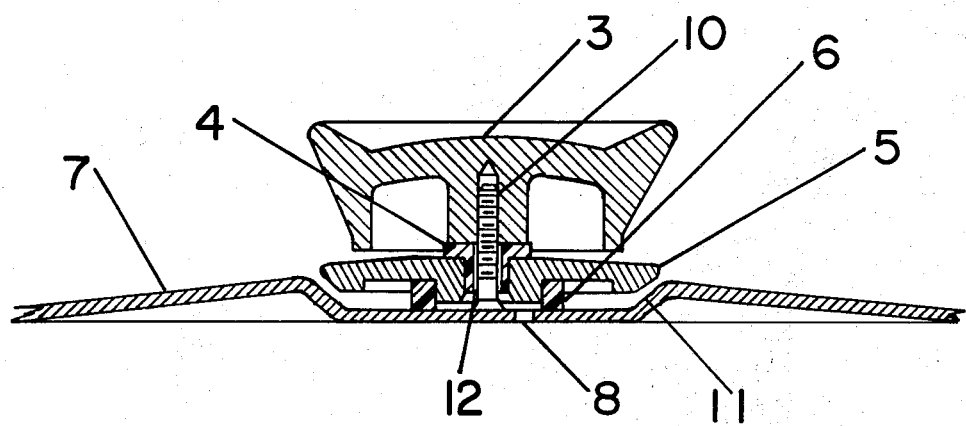
Fig. 2

COOKWARE COVER RELEASE VALVE

STATEMENT OF PRIOR ART

Vacuum seal type cookware is designed to seal against atmospheric pressure and enable the user to cook foods in a vacuum. When the utensil is heated the air inside expands and escapes into the atmosphere. When the applied heat is lowered, or removed, so as to cause the utensil to cool, the internal air pressure drops, creating a vacuum. External air pressure, averaging 14.7 lbs. per square inch, forces the cover against the utensil, preventing cover removal unless heat is re-applied.

General Description of the Invention

This invention, the cookware cover release valve, enables the user to admit air into a utensil to neutralize utensil vacuum to effect cover removal.

A comparison between the invention and prior art: This invention differs from existing apparatus associated with water-less, vapor-seal, vacuum seal cookware in that it is not intended as a device for the escape, or exit, of air from the utensil, nor for the regulation of pressure or vacuum within the utensil, nor as a means for signaling.

This invention differs from valves employed with pressure-type cookware in that this invention functions in association with cookware having a negative internal air pressure, or vacuum, instead of a positive internal air pressure. It differs further, in that pressure cookers require cooling to be opened, where as vacuum sealed cookware must be heated to be opened.

A Brief Summary of the Invention

The nature and substance of the invention is a simple, reliable, easy-to-operate valve which, when closed, is compatible with the art of vacuum type cooking and which, when open, will permit easy access to utensil contents.

The object of the invention is to eliminate the need to re-heat a vacuum sealed cooking utensil, and its contents, for the purpose of removing the cookware cover and to effect a savings of both time and money.

A further object of this invention is to enable simple, quick, and convenient disassembly of parts for cleaning.

Other objects and advantages of the invention will be apparent from the following description.

DESCRIPTION OF THE DRAWING

In the accompanying drawings, forming a part of this specification, and in which like numerals are employed to designate like parts throughout the same, FIG. 1 is a pictorial view showing a utensil with the cover in place and related cover parts in exploded view, and, FIG. 2 is a broken-out elevation section of the cover and related parts in assembly.

In the drawing, wherein for the purpose of illustration, is shown a preferred embodiment of my invention, the numeral 7 designates the cover having an opening 8, a recessed well 11, centered about a screw 10. The well 11 centers plate 5 with respect to screw 10, without intimate contact with the screw, to allow a uniform obstruction-free air gap 12 to exist between screw 10 in proximity with bushing 4 mounted on plate 5. The opening 8 is the air path through the cover. The screw 10 is mounted perpendicular to the surface of cover 7 so as to provide parallel alignment of knob 3 and bushing 4 mating surfaces. The screw is threaded to mate with knob 3 and acting together with knob 3 is the leverage device for valve operation and for maintaining applied pressure between the complete assembly.

The numeral 5 designates an escutcheon plate having an opening perpendicular through its center to press-fit flanged bushing 4, and having a circular flange at its bottom side to accept gasket 6 and prevent an inward collapse, or other distortion, of the gasket from either atmospheric pressure, applied pressure, or both.

The numeral 6 designates a gasket which is used to compensate for surface variations of cover 7 and plate 5, as well as to compensate for slight non-perpendicular alignment of screw 10 with respect to cover 7. When forced into intimate contact with the plate 5 and cover 7, the gasket effectively restricts passage of air between the plate and the cover.

The numeral 4 designates a flanged bushing which is an operable part of the valve and is preferably press fitted into plate 5 to prevent dislocation of the bushing. It has an opening perpendicular through its center of sufficient diameter to receive screw 10 and allow an unobstructed air passage path 12 to exist between the screw-thread spiral on screw 10 and the bushing opening. The bushing is sufficiently resilient to compensate for minor surface variations of the knob 3 mating surface so that, when the bushing is forced into intimate contact with the knob, air passage between the bushing and the knob is effectively restricted. The underside of the flange bushing adjacent to plate 5 acts similarly to restrict air passage at this point. The bushing is of material sufficient to withstand repeated thrust of knob 3.

The numeral 3 designates a cookware cover knob of popular design having internal screw-threads for attachment to screw 10, and having a mating surface, perpendicular to the thread opening, for intimate contact with bushing 4.

The numeral 9 designates a cookware utensil which is typical and of the type that can be vacuum sealed with the cover in place. Utensil 9 engages cover 7 in intimate contact at the utensil edge, or rim.

The operation of the COOKWARE COVER RELEASE VALVE is as follows:

To close the valve, the knob 3 is threaded upon and tightened against screw 10 by hand so as to exert pressure through bushing 4 and plate 5 to compress gasket 6 against cover 7. Sufficient tightening of the knob 3 effectively restricts air passage between all mating surfaces. This renders the cover suitable for use in maintaining a vacuum inside the utensil 9 with which it is used.

To open the valve, the knob 3 is threaded away from screw 10 by hand and loosened. This breaks intimate contact of the knob with the bushing, and allows entry of air at this point, passing through and along the thread-spiral of screw 10 and entering the utensil through cover 7 at opening 8. Air can then enter utensil 9 to neutralize internal vacuum and enable the cover to be removed.

It is understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A cookware cover release valve for vacuum type cookware comprising a cookware utensil having an opening therein, a cover to close the utensil opening and having a recessed well and an air inlet opening, a gasket to encompass the cover opening, a plate having an opening therethrough and means to support the gasket in contact about the cover opening, a resilient bushing with a flat upper surface in the plate opening and having a central opening perpendicular to the bushing upper surface, a hand-rotatable knob having a surface substantially parallel to and mating with the upper bushing surface, a threaded screw having a diameter less than that of the bushing center opening attached to the cover surface engaging the knob and functioning with the knob as a device to force the valve open or closed.

2. A cookware cover release valve for vacuum seal type cookware comprising a cookware utensil having an opening, a cover to engage the utensil opening having an upstanding threaded-screw and an air passage opening, a gasket to compensate for slight perpendicular misalignment of the cover surface, a plate having an opening therethrough, and means on the bottom surface of the plate to support and position the gasket, a resilient bushing in said plate opening, said bushing having a flat upper surface and an opening perpendicular to the upper surface to receive the cover screw and provide an air passage path; a knob having internal threads in the bottom side and a flat surface parallel to bushing upper surface for mating in intimate contact with the bushing flange to close the valve.

3. A cookware cover release valve comprising a cookware utensil having an opening; a cookware cover closing the utensil opening having an air inlet opening, a recessed well, and a threaded screw projecting from the well; a plate having an opening and a circular flange perpendicular to the plate bottom, a gasket engaging the plate flange as a sealing means between the cover and the plate, a resilient bushing having an opening perpendicular to the flanged surface loosely engaging the cover screw and being positioned in the plate opening, a knob having internal screw-threads and a flat mating surface substantially parallel with and adjacent to the bushing flange for intimate contact with the bushing flange when the knob is revolved about the screw to close the valve.

4. A cookware cover release valve comprising a cookware cover having an upstanding screw and an air passage opening, a cookware utensil having an opening to receive and seal with the cover, a flexible gasket to encircle the cover air passage opening, a plate having an opening therethrough and a bottom flange encircling the opening to position the gasket, a resilient bushing having an upper mating flange and an opening therethrough receiving the cover screw and defining an air passage along the screw, a hand-actuated knob having a screwthreaded opening engaging the cover screw and operating therewith to effectively open and close the valve.

5. A cookware cover release valve for vacuum type cookware comprising:
   a. a cookware utensil having an opening therein, a cover to close the utensil opening and having a threaded screw extending therefrom and an opening through the cover adjacent the screw;
   b. a knob threaded upon the screw so that rotation of the knob moves it toward and away from the cover surface;
   c. valve means between the underside of the knob and the top of the cover, said means comprising:
      1. a plate mounted on the threaded screw by an opening of sufficient size to define an air passage between it and the screw;
      2. sealing means between the underside of the plate and the top of the cover so that the air passage is in communication with the cover opening;
      3. means on the underside of the knob and the top of the plate to effect a seal therebetween when the knob is rotated toward the plate so as to prevent passage of air through said air passage.

6. The valve of claim 5 in which the sealing means between the underside of the plate and the top of the cover is an annular seal having a radius at least equal to the distance from the screw to the opening.

7. The valve of claim 5 including means on the underside of the plate to position the sealing means.

8. A cookware cover release valve for vacuum type cookware having a cover to close a utensil opening and seal therewith, said valve comprising:
   a. an opening through a utensil wall to communicate the interior of said utensil with the atmosphere;
   b. means to selectively open and close said opening comprising:
      1. a hand operable knob means adjacent the opening and mounted for movement toward and away from the opening on a threaded screw extending between the knob and the utensil wall;
      2. plate means on said screw between the knob and the utensil, the screw passing through a hole of sufficient size to define an air passage between it and the screw;
      3. sealing means between the underside of the plate and the outside of the utensil so that the air passage is in communication with the opening through the utensil wall;
      4. means on the underside of the knob and the top of the plate to effect a seal therebetween when the knob is rotated toward the plate so as to prevent passage of air through said air passage.

9. The valve of claim 8 in which the sealing means between the underside of the plate and the top of the cover is an annular seal having a radius at least equal to the distance from the screw to the opening.

10. The valve of claim 8 including means on the underside of the plate to position the sealing means.

* * * * *